March 8, 1955     A. SELIGMAN     2,703,583
VALVE FOR COMPRESSORS

Filed May 24, 1949     2 Sheets-Sheet 1

*Arthur Seligman*
INVENTOR.

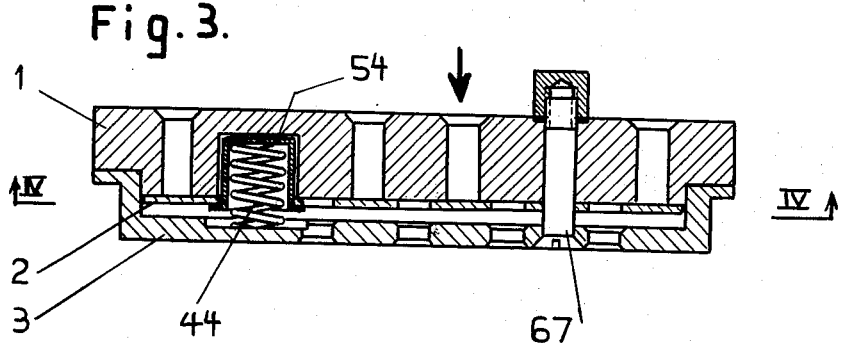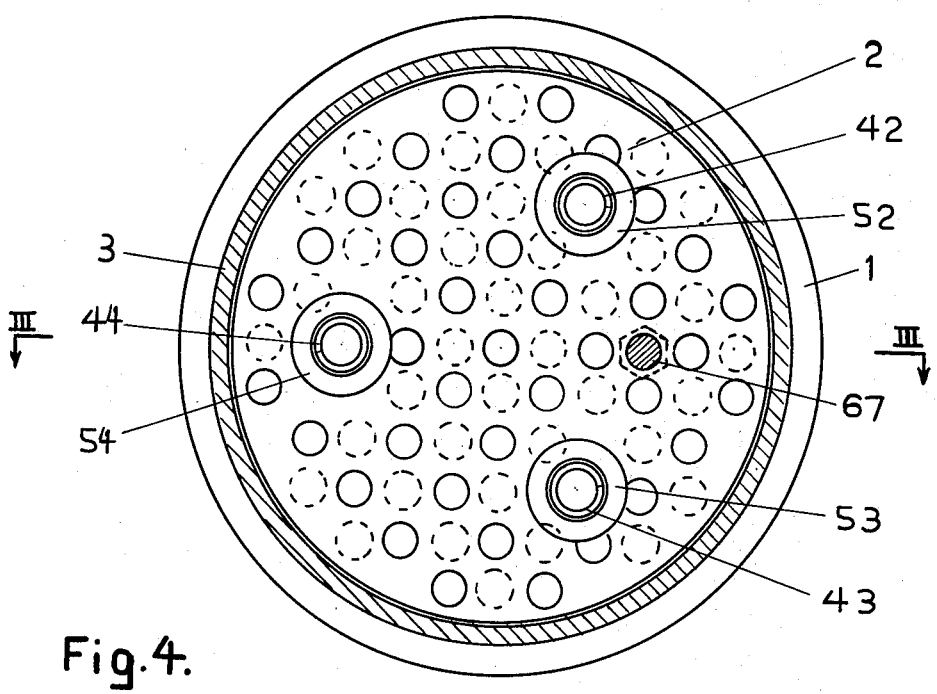

United States Patent Office 2,703,583
Patented Mar. 8, 1955

2,703,583

VALVE FOR COMPRESSORS

Arthur Seligman, Newark, N. J.

Application May 24, 1949, Serial No. 95,049

4 Claims. (Cl. 137—454.4)

This invention relates to automatic compressor valves, that is valves which control the flow of gas to and from the cylinder of a reciprocating compressor and are governed by springs within the valve itself, thus not requiring any actuation from outside.

The main object of the invention is to reduce the clearance volume of such valves without impairing their safe and reliable operation or substantially increasing the cost or difficulty of manufacture. This purpose is achieved by the use of a retainer between spring and sealing member (plate) and locating the major part thereof within a recess of the valve seat.

The advantage of the invention lies in its application to suction valves, although in many cases it will be possible to turn the valves around and use them for discharge.

Figure 1:
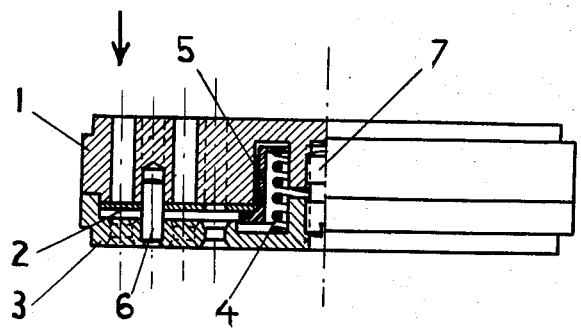
Figure 2:
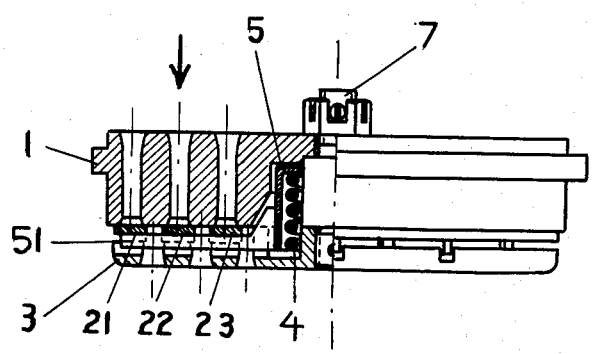

Figure 1 shows, half in section and half in elevation one variation of the inventional valve, namely a design with one single circular plate and one centrally located spring; Figure 2 shows, likewise half in section and half in elevation, another construction, namely a plurality of ring plates, separate from each other and concentrically arranged, and simultaneously actuated by one centrally located spring. Figure 3 is a vertical section along the line III—III of Figure 4, and the latter a horizontal section along the line IV—IV of Figure 3, both figures illustrating a variation with one plate, but several springs. The terms "horizontal," "vertical," "up," "down" or equivalents here and hereafter used refer to the position in the drawings only; for actual operation the valves may be installed in any position.

Plate valves usually consist of a valve seat, provided with slots or holes for the passage of the gas, a guard, likewise provided with passage ways, which are staggered against those in the seat, one or several valve plates, one or several springs, which are located within the guard and rest upon the plates, and finally a means to hold the assembly together, usually one or several screw bolts.

The thickness of the seat is usually determined by considerations of structural strength, as it must withstand the gas pressure without undue deflection. The thickness of the guard, however, is usually determined by the fact that it must house the springs, and in most cases the guard is, thus, much thicker than it need be for strength alone. It is, of course, desirable to keep the thickness small, not only for reasons of cheaper manufacture, but chiefly because it is the decisive factor for the clearance space, the guard determining the clearance volume on the suction side, and the seat that on the discharge side.

It will be seen that the greater part of the cavity which houses the spring is located within the valve seat. It is, thus, possible to keep the thickness of the valve guard down to the dimension required by the consideration of stress, and so to reduce the clearance volume to a minimum.

In the variation of Fig. 1 the seat 1 is provided with a number of holes for the passage of the gas; the plate 2 and the guard 3 have also holes, registering with each other, but not with those in the seat; thus, when the plate is pressed against the seat, the valve is closed; but when the gas pressure on the upstream side overcomes the force of the spring 4 and lifts the plate off the seat, the gas can pass through the openings in the seat, underneath the plate, through its holes and through the holes in the guard to the downstream side of the valve. A cup-shaped retainer 5 contains the major part of the spring, which with one end rests against the bottom of the cup and with the other against the guard. The retainer has a rim on its open end which projects under the plate, thus the spring load is transmitted from the guard to the plate, urging the latter towards the seat. A guide pin 6 keeps the parts in proper alignment, and a center bolt 7 holds the whole assembly together; the latter has a right hand thread on one end and a left hand thread on the other; thus, seat, guard, and plate can be pulled together without relative rotation; and the bolt is prevented from turning loose and falling into the cylinder.

Fig. 2 shows another variation; three independent valve rings 21, 22, and 23 cover arcual slots in the seat; a number of radial arms 51, e. g. six, are rigidly connected to the cup and stretch across the plates. The function of corresponding parts, which are marked with the same reference numbers, is, of course, the same as in Fig. 1. No guide pins are necessary here, as the angular position of the parts does not matter. The bolt is locked in the usual way by pins; it penetrates the seat, but a collar provides a reliable seal. As can be seen, the springs and cups surround the bolts; this is, as a rule, the best utilization of space, but not an absolute requirement for the invention. Neither the springs, nor the bolts need be located at the center of the valve; for large valves several of them may be used. Other means may be applied to hold the assembly together, e. g. snap rings on the outer rim of seat and guard.

Figs. 3 and 4 show another variation, where three springs 42, 43, and 44 with three cups 52, 53, and 54 are used on one plate, and where the clamping and the aligning element are combined to one screw 67, which does not go through the spring well. The function of the parts is again the same as in the foregoing examples, and needs, therefore, no further explanation.

With the conventional construction it was the natural endeavor of every designer to use springs with thin wire sections and few coils in order to arrive at shallow spring grooves; to provide the required load these springs had to be heavily deflected, and, thus, high shear stresses became unavoidable. The invention, however, allows spring wells of any required depth without increasing the clearance space; it becomes, therefore, possible to apply springs with many coils and large wire sections, and, so, to hold the stress at any desired low value. In as much as compressor valve springs are deflected several hundred times per minute, this is an important step towards greater safety and reliability.

It is often desired to use compressor valves reversibly, that is to have identical valves for either suction or discharge by simply turning them around, and to achieve this simplification a slight sacrifice in efficiency is often tolerated. As mentioned above, it is possible to use the inventional valves in this manner. No advantage is brought about for the discharge side, but, in as much as the seat has to have a substantial thickness anyhow, the combined clearance volumes of suction plus discharge valves will still be smaller than for the old design where the spring grooves are located within the guard.

Auxiliary springs have been located in the valve seat before; those are small springs which urge the plate away from the seat and, thus, counteract the main springs; in as much as this arrangement leaves the main springs and their wells unchanged, it does not improve the clearance volume or relieve any stress; to the contrary, the total clearance volume is increased. Attempts have also been made to accommodate the main springs within the valve seat; as they must urge the plate towards the seat, they could possibly be extension springs, one end of which would have to be fastened to the seat, and the other to the plate and cross arms resp. However, either the ends of these extension springs would have to be highly stressed, or rather complicated fasteners would have to be resorted to. For this reason compression springs are greatly preferable; to house this type of spring the sealing member was provided with one or several deep recess, which, however, are very undesirable from the viewpoint of manufacture, as well as maintenance. The inventional cup-shaped retainers, interposed between springs and plates make possible a combination of easy manufacture, simple maintenance, low stress, and yet small clearance volume.

The term "a number of," as used in the following claims, means any number including one.

I claim:

1. Automatic compressor valve, comprising a seat, a guard, at least one flat plate, and at least one coiled compression spring and a retainer for each spring; seat, guard, and plates provided with passage openings for the gas, those in or between the plates aligned with those through the guard, but not with those through the seat; seat and guard connected rigidly with each other so that they face each other with two parallel planes at a distance; the plates held in the space bteween them movably in the direction rectangular to these planes; the retainers cup-shaped, their major part contained in recesses within the seat, the open end looking towards the guard, and having projections on said open end, which extend across a portion of the plates on the side facing the guard; the major part of said springs being located within the retainers, one end resting against the bottom of the cup, the other against the guard.

2. Valve as per claim 1 with a single plate, the retainer cup having a relatively narrow rim at its open end, which engages the plate.

3. Valve as per claim 1 with several ring plates, the retainer cup having radial arms at its open end, which stretch across the plates.

4. Valve as per claim 1, held together by at least one screw bolt, the springs and retainers surrounding these bolts, which pass through a hole in the bottom of the cup.

References Cited in the file of this patent

UNITED STATES PATENTS

| | | |
|---|---|---|
| 402,647 | Beldam | May 7, 1889 |
| 1,563,144 | Baker | Nov. 24, 1925 |
| 1,669,424 | Schneider | May 15, 1928 |
| 2,035,776 | Voss | Mar. 31, 1936 |
| 2,222,550 | Wintzer | Nov. 19, 1940 |

FOREIGN PATENTS

| | | |
|---|---|---|
| 10,362 | Great Britain | May 31, 1892 |
| 484,139 | Great Britain | May 2, 1938 |
| 487,926 | Great Britain | June 28, 1938 |
| 166,176 | Germany | Dec. 22, 1905 |
| 178,342 | Germany | Nov. 14, 1906 |